No. 777,361. PATENTED DEC. 13, 1904.
J. P. WYMER.
FEED CONTROLLER.
APPLICATION FILED MAR. 23, 1904.
NO MODEL. 2 SHEETS—SHEET 1.
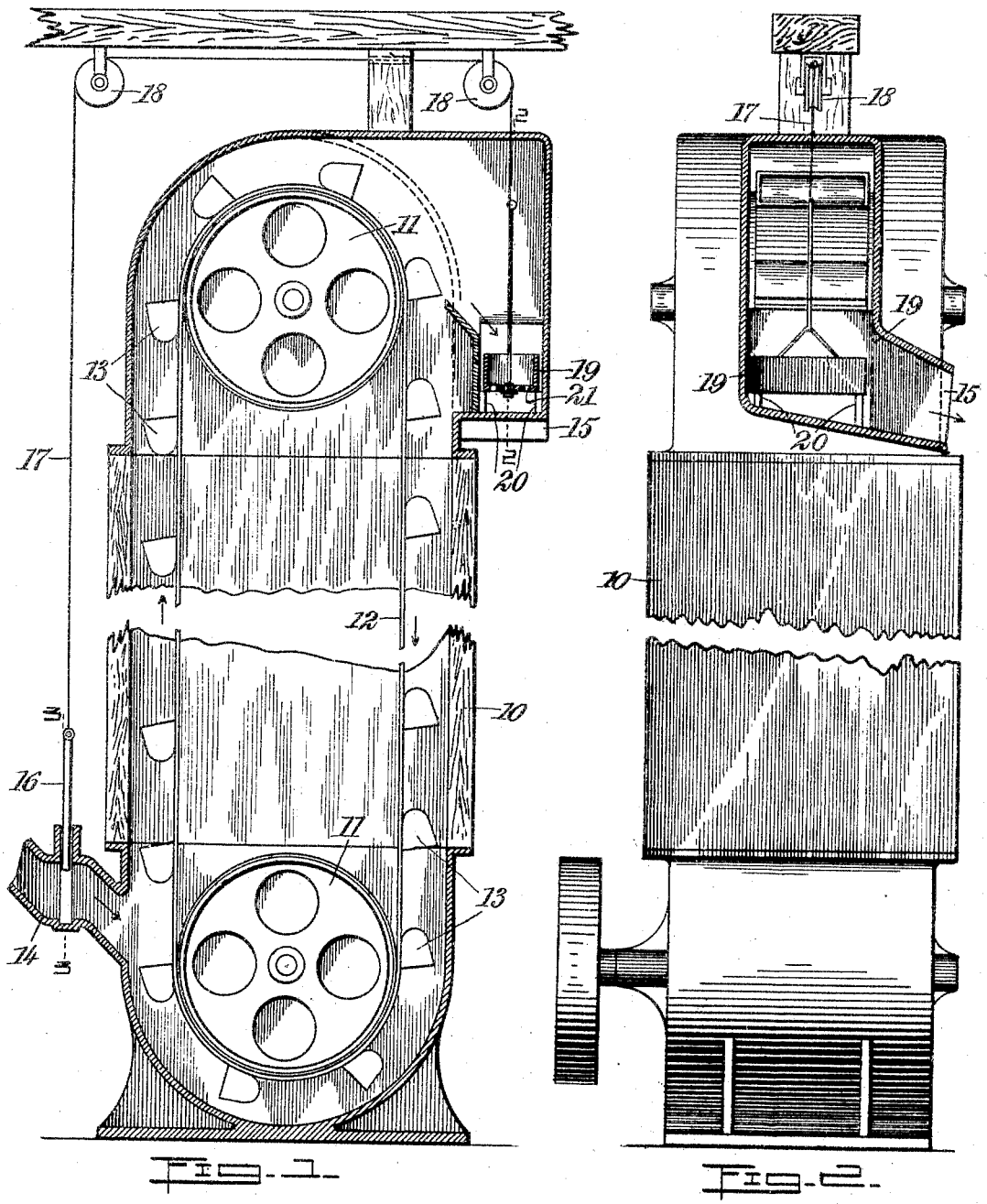
WITNESSES:
INVENTOR
John P. Wymer
BY
ATTORNEYS No. 777,361. PATENTED DEC. 13, 1904.
J. P. WYMER.
FEED CONTROLLER.
APPLICATION FILED MAR. 23, 1904.
NO MODEL. 2 SHEETS—SHEET 2.
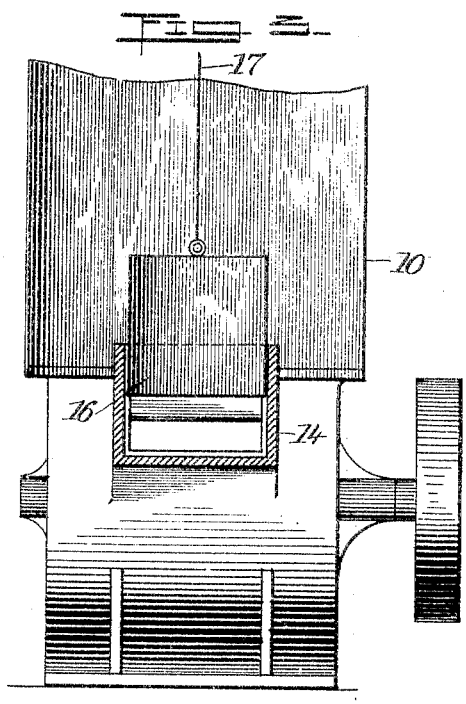
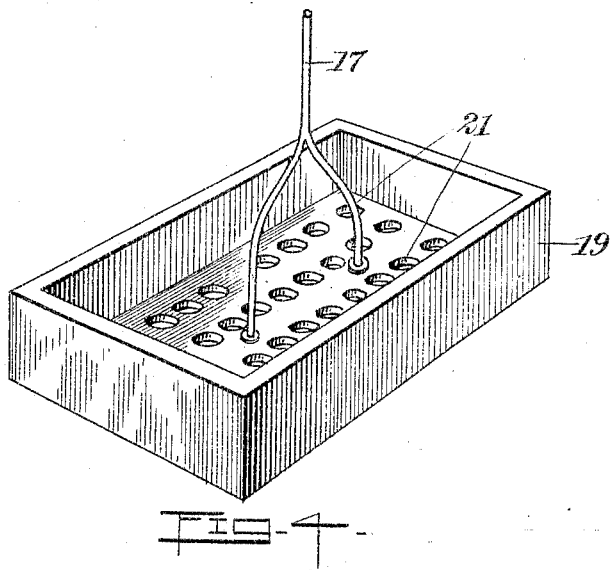
WITNESSES:
INVENTOR
John P. Wymer
BY
ATTORNEYS No. 777,361. Patented December 13, 1904.

UNITED STATES PATENT OFFICE.

JOHN P. WYMER, OF OURAY, COLORADO.

FEED-CONTROLLER.

SPECIFICATION forming part of Letters Patent No. 777,361, dated December 13, 1904.

Application filed March 23, 1904. Serial No. 199,577. (No model.)

*To all whom it may concern:*

Be it known that I, JOHN PHILIP WYMER, a citizen of the United States, and a resident of Ouray, in the county of Ouray and State of Colorado, have invented a new and Improved Feed-Controller, of which the following is a full, clear, and exact description.

My invention relates to devices for controlling the feed of material to such apparatus as elevators, being more especially applicable to those operating upon fluid or mobile substances, such as liquid or somewhat finely pulverized material. In such elevators, particularly those of the bucket type, a cessation of movement is liable to occur through slipping off or breaking of the belt, the catching of the buckets upon obstructions, and through accidents to the driving mechanism. When this happens, the boot of the elevator fills up and resists movement of the buckets, and therefore has to be cleaned out before the apparatus can be started, thus causing much delay and considerable expense. To prevent this is the principal object of my invention.

Reference is to be had to the accompanying drawings, forming a part of this specification, in which similar characters of reference indicate corresponding parts in all the figures.

Figure 1 is a broken central vertical section through an elevator to which one embodiment of my invention is applied. Fig. 2 is a transverse section on the line 2 2 of Fig. 1. Fig. 3 is a sectional detail on the line 3 3 of Fig. 1, and Fig. 4 is a perspective view of the gate-controlling receptacle.

10 designates a suitable casing, in the upper and lower portions of which are journaled the shafts of pulleys 11 11, over which operates a belt 12, provided with a series of elevator-buckets 13. Into the lower section or boot of the elevator-casing opens a supply chute or conduit 14, and at the opposite side of the upper or head section is a delivery chute or conduit 15. To control the feed of material through the chute 14, a gate 16 is provided, here shown as sliding in suitable ways in the walls of the chute and connected by a cord or flexible member 17, passing over pulleys or other supporting devices 18 18, to a receptacle 19, situated at a point in the delivery-chute at which the elevator-buckets empty and preferably resting upon stops 20, which support it at some distance from the bottom of the chute. This receptacle is here shown as an open box of rectangular form, in the bottom of which are openings 21. The weight of the receptacle and gate and the length of the connecting member are such that when the box is filled with the material discharged from the buckets its weight will exceed that of the gate, which will be held open, as is shown in Fig. 1. If for any reason the discharge from the buckets ceases, the flow through the perforated bottom of the receptacle will quickly empty it, sufficiently diminishing its weight to allow the gate to overbalance it, the latter consequently falling and closing the supply-chute. This promptly cuts off the feed and does away with any possibility of the bottom becoming choked, it remaining in this closed position until it is desired to again start the elevator. Then what material has gathered in the boot will be delivered to the receptacle and accomplish this, or the gate may be raised by hand.

It will be seen that while my improved controller is perfectly effectual in performing the desired function it adds but slightly to the expense of the apparatus and is not liable to get out of order.

Having thus described my invention, I claim as new and desire to secure by Letters Patent—

1. The combination with an elevator, of means for controlling the supply of material thereto, and means operable by a delivery of material from the elevator to actuate the controlling means.

2. The combination with an elevator-casing having supply and delivery conduits, of a gate in the supply-conduit, and means for actuating the gate situated in the delivery-conduit.

3. The combination with an elevator-casing having supply and delivery conduits, of a gate in the supply-conduit, and a movable receptacle situated in the delivery-conduit and connected with the gate.

4. The combination with an elevator-casing having supply and delivery conduits, of a gate in the supply-conduit, and a movable receptacle provided with openings through which material may escape, situated in the delivery-conduit and connected with the gate.

5. The combination with an elevator-casing having supply and delivery conduits, of a gate in the supply-conduit, and a movable receptacle provided with openings through which material may escape, situated in the delivery-conduit and connected with the gate, said receptacle when loaded being of greater weight than the gate.

6. A feed-controller comprising a gate situated in the path of the supplied material, a receptacle situated in the path of the delivered material, and a flexible connector between the gate and receptacle.

7. A feed-controller comprising a gate situated in the path of the supplied material, a perforated receptacle situated in the path of the delivered material, and a flexible connector between the gate and receptacle.

In testimony whereof I have signed my name to this specification in the presence of two subscribing witnesses.

JOHN P. WYMER.

Witnesses:
A. C. BRINKER,
J. S. McPHERSON.